Figure 1:
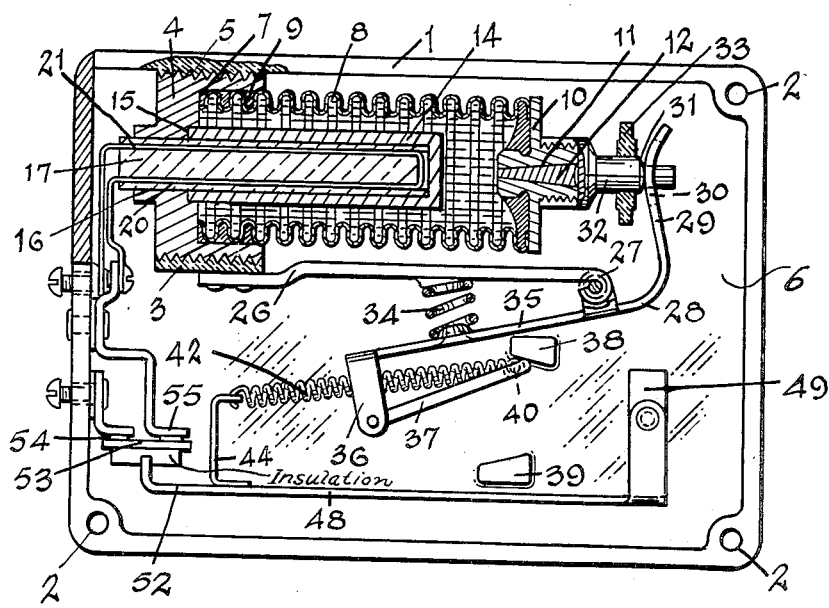

March 9, 1937.　　　　E. C. RANEY　　　　2,073,286

MOTOR OVERLOAD CUT-OUT SWITCH

Filed Aug. 31, 1933

Inventor

Estel C. Raney

By Faust F. Crampton

Attorney

Patented Mar. 9, 1937

2,073,286

UNITED STATES PATENT OFFICE 2,073,286

MOTOR OVERLOAD CUT-OUT SWITCH

Estel C. Raney, Columbus, Ohio, assignor to Ranco Incorporated, Columbus, Ohio, a corporation of Ohio Application August 31, 1933, Serial No. 687,668

5 Claims. (Cl. 200—122)

My invention relates to automatic cut-out switches for protecting electric motors from damage by heat resulting from overloads of the motor or from heat caused by prolonged operation of the motor while carrying a relative heavy load, or when heat from the atmosphere or heat conducted from other sources taken in connection with the heat produced by a normal current, causes an excess temperature that tends to damage the motor.

As is well known, an electric motor will generate heat during an overloaded condition that, if unduly extended, will destroy the winding insulation of the motor. Destruction of the insulation on the windings causes short circuiting of the wires, impairing the efficiency of the motor and necessitating replacement of the windings and overhauling of the motor. My invention protects electric motors from excessive heat by providing means for opening the motor circuit at a desired temperature.

My invention has for its object to provide a compact, efficient motor cut-out switch having a means comprising an electric heat element and supported on a motor housing in heat transferring relation to an expansible fluid to actuate the switch when the heat transmitted to the said fluid reaches a predetermined degree either from the heat element or the housing or both.

Another object of my invention is to provide means for adjusting the motor overload cut-out switch so that it operates to open the motor circuit at desired temperatures, rendering the switch efficient for motors of various current ratings.

As is well known, upon starting of the motor, it is necessary for the motor to overcome various resistances to starting, such as inertia and friction, and starting overloads or peaks will be produced in the motor circuit, which normally do not occur in subsequent operation of the motor. Inasmuch as the cut-out switch is operated only after a period of time during which the heavier starting current may safely flow, it gives ample opportunity for starting the motor, but when the heat produced by the heat element in the motor circuit reaches a predetermined degree, the switch will, by failure of the motor to start, open the circuit of the motor. The delayed, though safe operation of the control, enables the motor to carry a greater load during starting peaks than that which the motor normally carries, but opens the circuit before the overload produces a possible injurious temperature. When the temperature of the fluid of the control decreases to a point below the said predetermined temperature, the switch is closed, whereupon, if desired, the motor may be started.

The invention consists in other features and advantages which will appear from the following description and upon examination of the drawing. Structures containing the invention may partake of different forms and may be varied in their details and still embody the invention. To illustrate a practical application of the invention, I have selected a motor overload cut-out switch embodying the invention as an example of the various structures and shall describe the structure hereinafter, it being understood that variations and modifications may be made without departing from the spirit of the invention. The particular structure selected is shown in the accompanying drawing.

Figure 3:
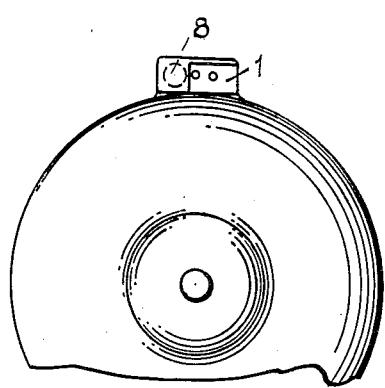
Figure 2:
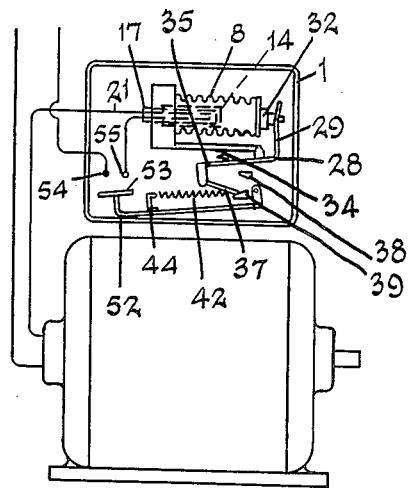

Fig. 1 is a view of a motor overload cut-out switch. Fig. 2 is a diagrammatic view of the motor overload cut-out switch. Fig. 3 is a view of the motor overload cut-out switch mounted on the motor.

As shown in the figures, positioned on the motor housing is a shell 1 preferably constructed of heat conductive material and secured to the motor by suitable bolts or rivets which extend through the openings 2, located in the edge part of the shell. The opening 6 within the area of the edge of the shell affords free radiation of the heat from the motor body to the thermostatic element that controls the switch. The shell 1 is provided with an inwardly projecting boss or wall 3 which is internally threaded to receive a bellows supporting base 4, externally threaded at 5. The base 4 is provided with a socket 7, in which is positioned one end of a flexible metal bellows 8. The end of the bellows 8 is secured in the socket 7 by means of a solder seal 9.

The other end of the bellows 8 is closed by a member 10, having a flange part that is soldered to the end of the bellows. The member 10 has an opening 11 through which a liquid, having a low vaporizing or boiling point, may be inserted into the bellows. After insertion of the liquid, the opening 11 is closed and sealed by a plug 12.

Positioned in the bellows 8 and socketed in a recess 15 of the base 4 is a hollow metallic bushing 14, having a closed outer end. The base 4 has an opening 16 of substantially the same diameter as the internal diameter of the bushing 14. Positioned in the member 14 and extending therethrough and through the opening 16, is a core 17 consisting of a porcelain rod having a U-shaped duct 20, in which is located a resistance wire 21 that may be connected in series in the motor circuit and operates to quite directly heat the fluid surrounding the bushing.

When an overload condition occurs in the motor, the resistance wire becomes heated and heats the fluid in the bellows, causing expansion of the gas, and the pressure produced in the bellows thereby opens the switch. When the gas is sufficiently reduced in temperature, the bellows contracts and closes the switch. Also, by reason of the location of the shell 1, with respect to the motor housing and the conductivity of the shell, the heat from the motor and its housing will be transmitted through the shell to the bellows, effecting the expansion of the fluid in the bellows and the operation of the switch, in like manner. Thus the switch will open when an excess current flows for a short period but sufficient to effect quite directly and rapidly the expansion of the gas in the bellows, or when a current having an amperage but slightly larger than the normal current rating for the particular motor, flows substantially continuously for a longer period, but so as to produce a rise in temperature of the fluid in the bellows due to the accumulative effect of the heat transmitted through the motor and the heat of the wire within the bellows.

In order that the bellows may actuate the switch at desired predetermined temperatures, it is supported in operative relation to an actuating lever 28 which is pivotally supported in the bracket 26 secured to a part of the shell. The lever 28 has an arm 29, having a slot 30 and adapted to engage the shoulders 31 of an adapter 32. The adapter has a part that extends into the slot 30 for maintaining the end of the lever in position, with respect to the bellows. The adapter is internally threaded and connected to the member 10 and maintained in slidable relation to the walls of the shell by a bracket member 33 through which a part thereof slidably moves as the bellows expands and contracts.

Supported on the bracket member 26 is a helical expansion spring 34, which engages with the lever 28 and yieldably maintains the arm 29 against the shoulders 31 of the adapter 32 and through which the spring transmits its pressure to the bellows to counteract the pressure of the gas within the bellows.

The arm 35 of the lever 28 is provided with fingers 36 in which is pivoted a double link member 37, movable between the stops 38 and 39 that protrude from the wall of the shell. The double link 37 is provided with a pin 40 to which is connected one end of a tension spring 42. The other end of the spring is connected to a finger 44 formed on the switch arm 48. The stops 38 and 39 are so located with reference to the pivotal connecting points of the link 37, and the point of connection of the spring 42 with the finger 44, as to cause the links to snap to and from one or the other of the stops 38 and 39 as the ends of the fingers 36 are raised and lowered by the operation of the bellows 8. One end of the switch arm 48 is pivotally supported on a bracket 49 secured to the wall of the shell 1. The switch arm carries a suitable movable contact 53 that is adapted to make contact with the fixed contacts 54 and 55 supported on the wall of the shell. Thus the switch is opened and closed by a quick snap movement of the switch arm.

When the bellows expands due to the expansion of the thermo-expansive fluid within the bellows, the arm 29 of the lever 28 is moved away from the guiding member 33, and the arm 35 of the lever moves against the pressure of the spring 34 to cause the pivot points of the link 37 in the finger 36 to pass through the line of tension of the spring 42. The tension of the spring 42 forces the link 37 to the stop 39, and the lateral component of the spring tension moves the switch arm 48 with a quick snap movement against the wall of the shell 1 to open the circuit and stop the motor. When the temperature of the fluid decreases, the bellows contracts, and when it is below the predetermined degree at which the bellows actuates the switch to open the motor circuit, the lever 28, pivoting in the opposite direction, causes the link 37 to again pass the spring 42, but in the opposite direction, and the link 37 is forced to the stop 38, the lateral component of the spring 42 moving the switch arm 48 to close the motor circuit through the contacts 53, 54, and 55.

Suitable adjusting devices may be provided for varying the temperature at which the switch mechanism is actuated by the bellows to open and close the motor circuit, and consequently the overload cut-out switch may be used as a protector for motors of different powers and having varying current ratings, eliminating the necessity of protectors, especially designed for motors of specified current ratings and power.

The operating temperature of the motor overload cut-out switch may be adjusted with respect to the lever 28 by rotation of the threaded base member 4, which shifts the base of the bellows along the line of movement of the adapter. The more the supporting base of the bellows is moved from the arm 29 of the lever 28, a greater expansion of bellows is required to open the switch, and the more the base member is moved towards the arm 29, the required expansion of the bellows to operate the switch is correspondingly reduced. Since the change in temperature and change in volume correspond, the pressure on the lever 28 at the switch opening point or position being substantially constant, the temperatures at which the switch is opened may be varied by longitudinal adjustment of the base of the bellows.

I claim:

1. In an electric motor thermic switch, a bellows for containing an expansible fluid, a bushing protruding into the bellows and having an inner closed end, a core of insulating material having a heater wire located therein and insertable within the bushing, the heater wire connected in the circuit of the motor, a switch operated by the change in volume of the bellows in response to change in temperature of the fluid, and means for adjustably shifting the bellows substantially in the line of the direction of the switch-operating movements of the bellows.

2. In an electric motor thermic switch, a heat conductive shell for enclosing the switch, means for mounting the shell on the body of the motor, a bellows for containing an expansible fluid supported on the wall of the shell, a heat conductive bushing located on the bellows and heat conductively supported on the wall of the shell, an insulating core extending into the bushing, an electric heater located on the core and in the circuit of the motor, a movable switch member operated by the change in volume of the bellows in response to change in the temperature of the fluid, and means for adjusting the responsive movements of the switch relative to the movement of the bellows.

3. In an electric motor thermic switch, a heat conductive shell having an open side for enclosing the switch, means for mounting the shell on the body of the motor to locate the edges of the open side contiguous to the motor, a bellows for containing an expansible fluid supported on one of the side walls of the shell, an electric heater located in the bellows and in the circuit of the motor, a movable switch member operated by the change in volume of the bellows in response to change in temperature of the fluid.

4. In an electric motor thermic switch, a heat conductive shell having an open side for enclosing the switch, means for mounting the shell on the frame of the motor to locate the edges of the open side contiguous to the motor, a movable switch member, an element mounted in the shell and operatively responsive to heat to move the switch member for operating the switch, an electric heater connected to the motor circuit and located in heating relation to said element whereby said element is subjected to heat generated by said heater and that generated in the motor frame.

5. In an electric motor control, a normally closed switch operative to control the motor circuit, a thermally responsive element for opening the switch when the element is heated to a predetermined temperature, means for supporting the element on the motor in heat conducting relation with the motor frame whereby heat generated in the motor frame may be conducted to the element to open the switch, an electric heater connected in the motor winding circuit and located in heat transferring relation to the said element whereby heat generated by the heater may cause the said element to open the switch.

ESTEL C. RANEY.